United States Patent
Saito

(10) Patent No.: US 9,706,121 B2
(45) Date of Patent: Jul. 11, 2017

(54) IMAGE PROCESSING APPARATUS AND IMAGE PROCESSING METHOD

(71) Applicant: CANON KABUSHIKI KAISHA, Tokyo (JP)

(72) Inventor: Mitsuhiro Saito, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 172 days.

(21) Appl. No.: 14/524,234

(22) Filed: Oct. 27, 2014

(65) Prior Publication Data

US 2015/0116512 A1    Apr. 30, 2015

(30) Foreign Application Priority Data

Oct. 29, 2013 (JP) .................................. 2013-224622
Aug. 7, 2014 (JP) .................................. 2014-161862

(51) Int. Cl.
*H04N 5/232* (2006.01)
*G06T 7/33* (2017.01)

(52) U.S. Cl.
CPC .......... *H04N 5/23254* (2013.01); *G06T 7/33* (2017.01); *H04N 5/23251* (2013.01); *G06T 2207/10016* (2013.01); *G06T 2207/20021* (2013.01); *G06T 2207/20201* (2013.01)

(58) Field of Classification Search
CPC .... H04N 5/144–5/145; H04N 5/23254; H04N 5/23264; H04N 19/139; H04N 19/51; H04N 19/513; H04N 19/521; G06T 7/20–7/2093
See application file for complete search history.

(56) References Cited

U.S. PATENT DOCUMENTS

| 2007/0064115 A1* | 3/2007 | Nomura | H04N 5/23248 348/208.99 |
| 2009/0232216 A1* | 9/2009 | Kurata | G06T 7/2013 375/240.16 |
| 2013/0314557 A1* | 11/2013 | Furukawa | H04N 5/225 348/208.1 |

FOREIGN PATENT DOCUMENTS

| JP | 2009-219082 A | 9/2009 |
| JP | 2010-183291 A | 8/2010 |
| JP | 2011-070568 A | 4/2011 |

OTHER PUBLICATIONS

The above foreign patent documents were cited in the Oct. 30, 2015 Japanese Office Action, which is enclosed without an English Translation, that issued in Japanese Patent Application No. 2014161862.

* cited by examiner

*Primary Examiner* — Lin Ye
*Assistant Examiner* — Chriss Yoder, III
(74) *Attorney, Agent, or Firm* — Cowan, Liebowitz & Latman, P.C.

(57) ABSTRACT

An image processing apparatus calculates correlation values between a plurality of images with respect to relative positions, and detects a motion vector between the plurality of images based on the calculated correlation values. The image processing apparatus then determines the reliability of the motion vector based on a value indicating the highest correlation among the correlation values and a correlation value obtained at a position that is distant by a predetermined distance or longer from a position at which the value indicating the highest correlation is obtained. In this way, the reliability of the motion vector can be determined with high accuracy.

17 Claims, 8 Drawing Sheets

IMAGE PROCESSING APPARATUS AND IMAGE PROCESSING METHOD

BACKGROUND OF THE INVENTION

Field of the Invention

The present invention relates to an image processing apparatus and an image processing method, and in particular to a technique to detect a motion vector between a plurality of images.

Description of the Related Art

In order to apply an anti-shake process to an image that has been captured using an image capture apparatus such as a digital still camera and a digital video camera, it is necessary to perform alignment by detecting a moving amount between a plurality of images (for example, frame images of a video). A moving amount between images is detected in various ways, e.g., by using information of an external device such as a gyroscope, and by way of estimation from the images.

A representative method for estimating a moving amount from images is to detect a motion vector through template matching. In template matching, one of two arbitrary images is used as a source image, and the other is used as a reference image. Correlation values (for example, distribution of luminance values) between a rectangular area (template block) of a predetermined size in the source image and a rectangular area in the reference image are obtained while changing the position of the template block. The position of the template block that yields a maximum correlation value is regarded as a move destination in the reference image, and a direction and an amount of movement from the position of the template block in the source image to the move destination are detected as a motion vector. With use of a motion vector obtained in the above-described manner, an anti-shake process, a moving object tracking process, and the like can be applied to an input image.

Template matching is a process to search the reference image for an area that has a high degree of similarity to the template block in terms of texture. Therefore, for example, in a case where the texture of the template block is a part of a repeating pattern or has low contrast, it is highly likely that the reference image includes a plurality of areas that have similar textures. In this case, there are a plurality of template block positions that yield large correlation values, and it becomes difficult to identify a position that serves as a true move destination; therefore, the possibility of failing to obtain a correct motion vector is increased (the reliability of a motion vector is reduced).

In view of this, Japanese Patent Laid-Open No. 2009-219082 suggests that whether or not the texture of a template block has a high possibility of failing to yield a correct motion vector (hereinafter referred to as a difficult area) be determined by analyzing the texture. An image processing apparatus described in Japanese Patent Laid-Open No. 2009-219082 detects a maximum correlation value and a local maximum of other correlation values, and determines whether or not the template block is a difficult area (whether or not the reliability of a motion vector detected using that template block is low) by comparing the maximum correlation value with the local maximum.

However, the image capture apparatus described in Japanese Patent Laid-Open No. 2009-219082 determines whether or not the template block is a difficult area based only on a magnitude relation between the maximum value and the local maximum among the correlation values, and does not consider a positional relation therebetween. Even if the template block is not a difficult area, it is not uncommon to obtain a correlation value that is close to the maximum correlation value in the neighborhood of a position that yields the maximum correlation value. It is thus difficult to determine the reliability of a detected motion vector with high accuracy only from a magnitude relation between the maximum value and the local maximum.

SUMMARY OF THE INVENTION

The present invention has been made in view of the above problem associated with a conventional technique, and provides an image processing apparatus and an image processing method capable of determining the reliability of a motion vector with high accuracy.

According to an aspect of the present invention, there is provided an image processing apparatus comprising: an obtaining unit configured to obtain a plurality of images; a calculation unit configured to calculate correlation values between the plurality of images with respect to relative positions; a detection unit configured to detect a motion vector between the plurality of images based on the correlation values; and a determination unit configured to determine reliability of the motion vector, wherein the determination unit determines the reliability based on a value indicating the highest correlation among the correlation values and a correlation value, among the correlation values, obtained at a position that is distant by a predetermined distance or longer from a position at which the value indicating the highest correlation is obtained.

According to another aspect of the present invention, there is provided an image processing apparatus comprising: an obtaining unit configured to obtain a first image and a second image; a calculation unit configured to calculate, for a plurality of positions in the first image, correlation values with respect to a reference area set in the first image; and a detection unit configured to detect a motion vector between the first image and the second image, wherein the detection unit sets an area from which the motion vector is detected based on a correlation value obtained at a position that is distant by a predetermined distance or longer from the reference area.

According to a further aspect of the present invention, there is provided an image capture apparatus comprising: the image processing apparatus according to the present invention; and an image capture unit configured to capture the plurality of images.

According to a yet further aspect of the present invention, there is provided an image processing method executed by an image processing apparatus, the image processing method comprising: an obtaining step of obtaining a plurality of images; a calculation step of calculating correlation values between the plurality of images with respect to relative positions; a detection step of detecting a motion vector between the plurality of images based on the correlation values; and a determination step of determining reliability of the motion vector, wherein in the determination step, the reliability is determined based on a value indicating the highest correlation among the correlation values and a correlation value, among the correlation values, obtained at a position that is distant by a predetermined distance or longer from a position at which the value indicating the highest correlation is obtained.

According to another aspect of the present invention, there is provided an image processing method executed by an image processing apparatus, the image processing method comprising: an obtaining step of obtaining a first image and a second image; a calculation step of calculating, for a plurality of positions in the first image, correlation values with respect to a reference area set in the first image; and a detection step of detecting a motion vector between the first image and the second image, wherein in the detection step, an area from which the motion vector is detected is set based on a correlation value obtained at a position that is distant by a predetermined distance or longer from the reference area.

According to a further aspect of the present invention, there is provided a non-transitory computer-readable storage medium storing a program for causing a computer to function as the units of the image processing apparatus according to the present invention.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

The following describes an embodiment in which an image processing apparatus according to the present invention is applied to an image capture apparatus. However, configurations related to image capture are not necessary in the present invention, and the present invention can be embodied on any electronic device capable of obtaining an image used in motion detection. Examples of such an electronic device include various devices such as a computer device, a game console, a mobile telephone, a tablet terminal and a robot, let alone an image capture apparatus and a device provided with an image capture apparatus.

Figure 1:
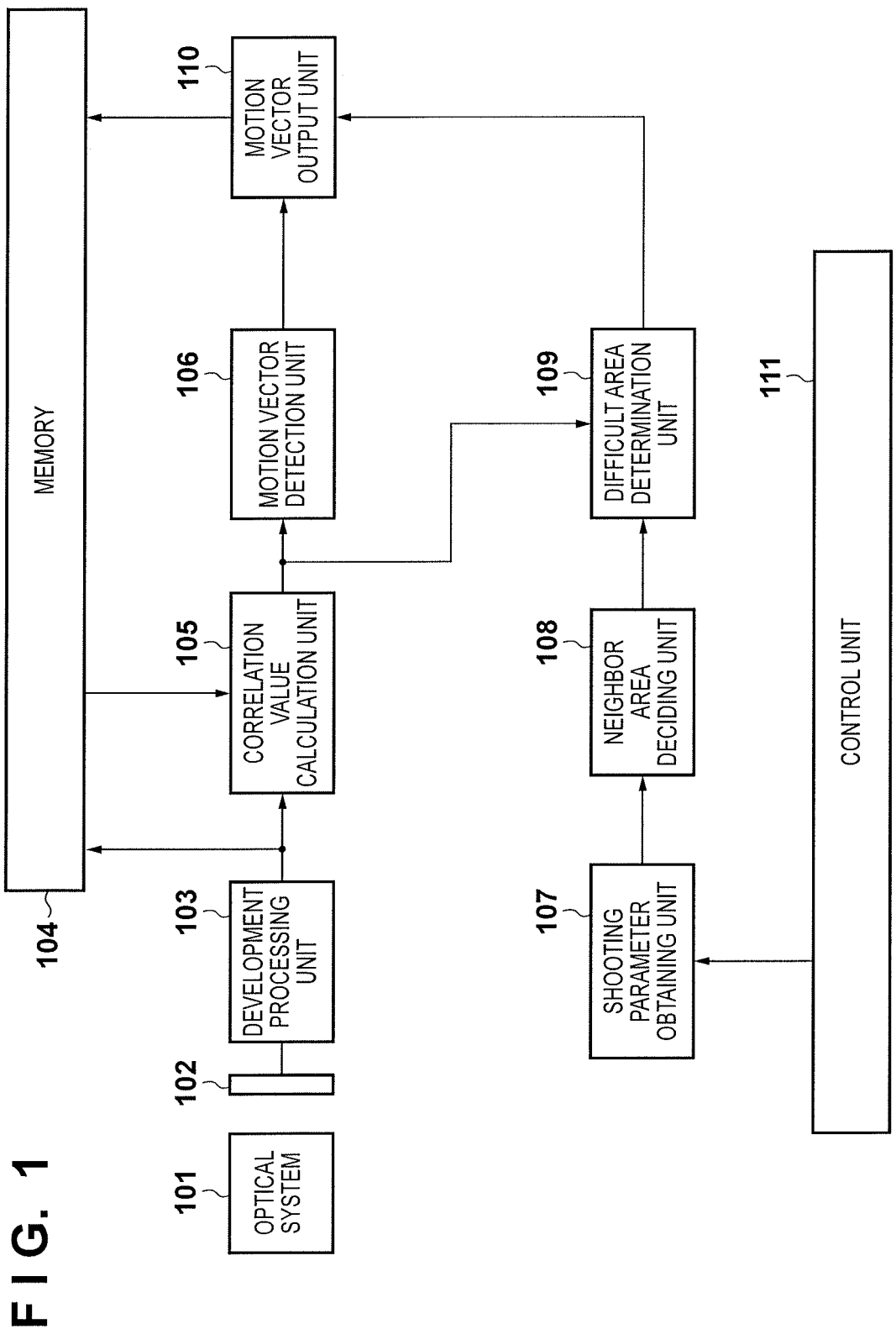
FIG. 1 is a block diagram showing an example of a functional configuration of an image capture apparatus, which is an example of an image processing apparatus according to a first embodiment of the present invention.

FIG. 1 is a block diagram showing an example of a functional configuration of an image capture apparatus, which is an example of an image processing apparatus according to the first embodiment of the present invention. An optical system 101 forms a subject image, and an image sensor 102 such as a CCD sensor and a CMOS sensor photoelectrically coverts the subject image formed by the optical system 101. A development processing unit 103 forms an image signal from an electrical signal output from the image sensor 102. The development processing unit 103 includes an A/D conversion unit, an automatic gain control (AGC) unit, an automatic white balance unit, and the like, and forms a digital image signal. The image sensor 102 and the development processing unit 103 constitute an image capture system that obtains an image. A memory 104 temporarily stores and retains one or more images corresponding to the digital image signal formed by the development processing unit 103.

A correlation value calculation unit 105 calculates correlation values between two images input from the development processing unit 103 and the memory 104. Based on the correlation values calculated by the correlation value calculation unit 105, a motion vector detection unit 106 detects an amount of movement between the two images as a motion vector. A shooting parameter obtaining unit 107 obtains a shooting parameter of the image capture apparatus. The shooting parameter may be obtained from the image capture apparatus, and may be obtained from metadata recorded together with images.

Based on the shooting parameter, a neighbor area deciding unit 108 decides on a range of a neighbor area in difficulty determination processing, which will be described later. With use of the correlation values obtained from the correlation value calculation unit 105 and the area determined and set by the neighbor area deciding unit 108, a difficult area determination unit 109 determines whether or not an area in which correlation values have been calculated is a difficult area. Then, a motion vector output unit 110 combines the motion vector detected by the motion vector detection unit 106 and a corresponding result of determination by the difficult area determination unit, and stores the combination into the memory 104.

A control unit 111 includes a programmable processor such as a CPU and an MPU, a non-volatile memory that stores control programs, setting values, and the like, and a volatile memory used as a working area and the like at the time of execution of programs. By controlling the components of the image capture apparatus through execution of the control programs, functions of the image capture apparatus are realized, including later-described motion vector detection processing. One or more of the development processing unit 103 through the motion vector output unit 110 (except for the memory 104) may be realized as software by the control unit 111, instead of being configured as a circuit.

Although not shown in FIG. 1, the image capture apparatus according to the present embodiment includes components of a general image capture apparatus. Such components are, for example, an operation unit that enables a user to input various types of settings and instructions, a display unit for displaying live views, captured images, various types of menu screens, and the like, and a recording/reproducing unit that performs recording on and reproduction of a recording medium such as a semiconductor memory card.

Figure 2:
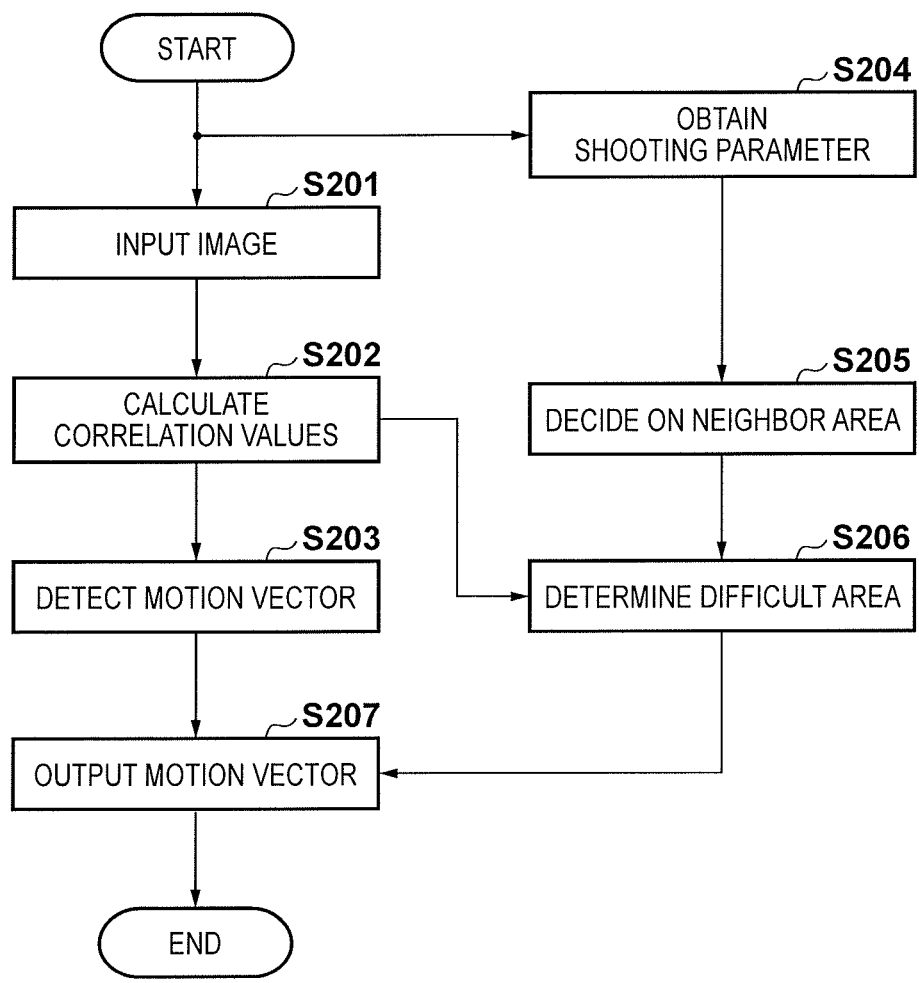
FIG. 2 is a flowchart for describing a motion vector detection operation of the image capture apparatus according to the first embodiment of the present invention.

A description is now given of an outline of a motion vector detection operation in the image capture apparatus configured in the above-described manner with reference to a flowchart of FIG. 2. The following describes a case in which a motion vector is detected using frame images of a video that is displayed as live views while capturing the video, e.g., at the time of image capture standby. However, as stated earlier, an image used in detection of a motion vector may be obtained using a method other than image capture.

In step S201, a frame image is generated by the development processing unit 103 applying processing to an analog image signal that is obtained by capturing a subject image formed by the optical system 101 with the image sensor 102. The development processing unit 103 causes the A/D conversion unit to convert the analog image signal into, for example, a 14-bit digital image signal. Furthermore, the AGC unit and the AWB unit apply signal level correction and white level correction to the digital image signal, and the corrected digital image signal is not only stored and retained in the memory 104, but also transmitted to the correlation value calculation unit 105. In the present embodiment, the control unit 111 controls the components such that frame images are generated sequentially at a predetermined frame rate, and frame images stored and retained in the memory 104, as well as frame images transmitted to the correlation value calculation unit 105, are updated sequentially.

In step S202, the correlation value calculation unit 105 calculates correlation values for a latest frame image input from the development processing unit 103 and an old frame image stored in the memory 104. The old frame image may be a frame image that was captured at an immediately preceding timing, and may be a frame image that is older by two or more frames. While the correlation value calculation unit 105 calculates correlation values using template matching in the present embodiment, other methods may be used.

Figure 3B:
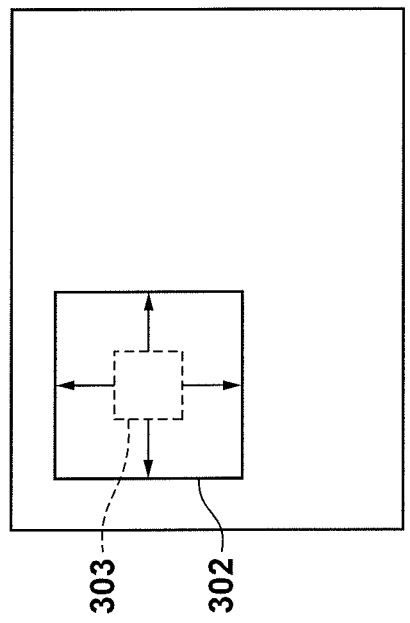
FIGS. 3A and 3B are schematic diagrams for describing template matching.
Figure 3A:
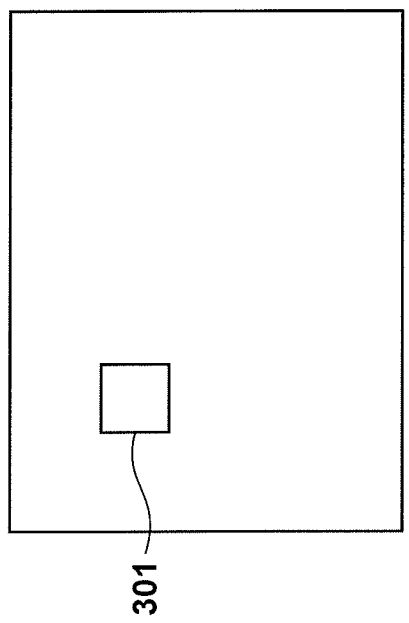

FIGS. 3A and 3B show an outline of template matching. FIGS. 3A and 3B show a source image (a frame image input from the memory 104) and a reference image (a frame image input from the development processing unit 103), respectively. As shown in FIG. 3A, a template block 301 is set at an arbitrary position in the source image, and correlation values for the template block 301 and areas in the reference image are calculated. At this time, if correlation values are calculated with respect to the entirety of the reference image, a calculation amount will be enormous; therefore, in general, a rectangular area (search range) 302 that is smaller than the entirety of the reference image is set for the purpose of calculating correlation values, and correlation values are calculated in the search range. No particular limitation is placed on the position and the size of the search range 302, and it may be set using any known method.

The present embodiment describes a case in which a sum of absolute difference (hereinafter abbreviated as SAD) is used as an example of a method for calculating correlation values. Expression 1 is a formula of SAD.

$$S\_SAD = \Sigma_i \Sigma_j |f(i,j) - g(i,j)|$$ (Expression 1)

In Expression 1, f(i,j) denotes a luminance value at coordinates (i,j) in the template block 301, and g(i,j) denotes a luminance value in a block (correlation value calculation area) 303 that is targeted for calculation of correlation values in the search range 302. The correlation value calculation unit 105 obtains a correlation value S_SAD by calculating absolute values of differences between luminance values f(i,j) and luminance values g(i,j) in both blocks, and obtaining a sum of the calculated absolute values. Therefore, the smaller the value of the correlation value S_SAD, the smaller the differences between luminance values in both blocks, that is to say, the higher the degree of similarity between the texture of the template block 301 and the texture of the block of the correlation value calculation area 303. In contrast, in a case where a correlation value is a reciprocal of S_SAD, the larger the value of the correlation value, the higher the degree of similarity between the texture of the template block 301 and the texture of the block of the correlation value calculation area 303. Correlation values are calculated by moving the correlation value calculation area 303 sequentially in the search range 302. The correlation value calculation unit 105 applies the above-described correlation value calculation processing to a plurality of areas.

While the SAD is used as an example of a correlation value in the present embodiment, no limitation is intended in this regard, and other correlation values such as a sum of squared differences (SSD) and a normalized cross-correlation (NCC) may be used. The correlation value calculation unit 105 supplies the calculated correlation values, as well as position information of the corresponding template block 301 and correlation value calculation area 303, to the motion vector detection unit 106 and the difficult area determination unit 109.

In step S203, the motion vector detection unit 106 detects a motion vector using the correlation values obtained from the correlation value calculation unit 105. The motion vector detection unit 106 determines a position that has yielded a value indicating the highest correlation (here, a minimum value) among correlation values calculated at different positions in the search range 302 in relation to the template block 301. This enables detection of a position in the reference image to which the template block 301 in the source image has moved, that is to say, a motion vector between the images. For example, the motion vector detection unit 106 calculates, as a motion vector, a vector whose initial point is coordinates at the upper left corner of the template block 301 and whose terminal point is coordinates at the upper left corner of the search range 302 that has yielded a minimum SAD. It goes without saying that other corresponding coordinates can also be used. The motion vector detection unit 106 supplies the calculated motion vector to the motion vector output unit 110.

In step S204, the shooting parameter obtaining unit 107 obtains shooting information of the image capture apparatus. Examples of a shooting parameter include an optical control parameter such as an f-number, a focal length (angle of view) and an in-focus distance (subject distance), and a control parameter for the image capture system such as a shutter speed. Also, motion information of the image capture apparatus at the time of image capture, which is obtained from a gyroscope mounted on the image capture apparatus, can be obtained as the shooting parameter among others. Such information may be obtained directly by the shooting parameter obtaining unit 107, and may be supplied by the control unit 111 that controls the image capture operations to the shooting parameter obtaining unit 107. The obtained shooting parameter of the image capture apparatus is supplied from the shooting parameter obtaining unit 107 to the neighbor area deciding unit 108.

In a case where two images from which a motion vector is to be detected are consecutive frame images of a video, it is highly likely that shooting parameters are the same, or a difference therebetween is small. It is thus sufficient for the shooting parameter obtaining unit 107 to obtain one of a shooting parameter for a source image and a shooting parameter for a reference image, and output the obtained parameter to the neighbor area deciding unit 108. Alternatively, the shooting parameter obtaining unit 107 may obtain both of the shooting parameter for the source image and the shooting parameter for the reference image and supply the obtained parameters to the neighbor area deciding unit 108.

In step S205, based on the shooting parameter of the image capture apparatus input from the shooting parameter obtaining unit 107, the neighbor area deciding unit 108 decides on the size of a neighbor area, which is necessary for determining a difficult area. It should be noted that, in a case where both of the shooting parameter for the source image and the shooting parameter for the reference image are supplied from the shooting parameter obtaining unit 107, the neighbor area deciding unit 108 may compare one parameter with the other. If the shooting parameter for the source image is significantly different from the shooting parameter for the reference image, the neighbor area deciding unit 108 may notify the difficult area determination unit 109 of the result of this determination. If the shooting parameter for the source image is significantly different from the shooting parameter for the reference image, the difference itself can cause reduction in the reliability of a motion vector, and therefore the difficult area determination unit 109 may determine that the reliability of the motion vector is low without making determination based on correlation values. If the difference between the shooting parameter for the source image and the shooting parameter for the reference image is small (for example, if the difference is equal to or smaller than one level), the neighbor area deciding unit 108 can decide on the size of the neighbor area based on one of the shooting parameters. Specifics of a method for deciding on the size of the neighbor area based on the shooting parameter will be described later.

Figure 4A:
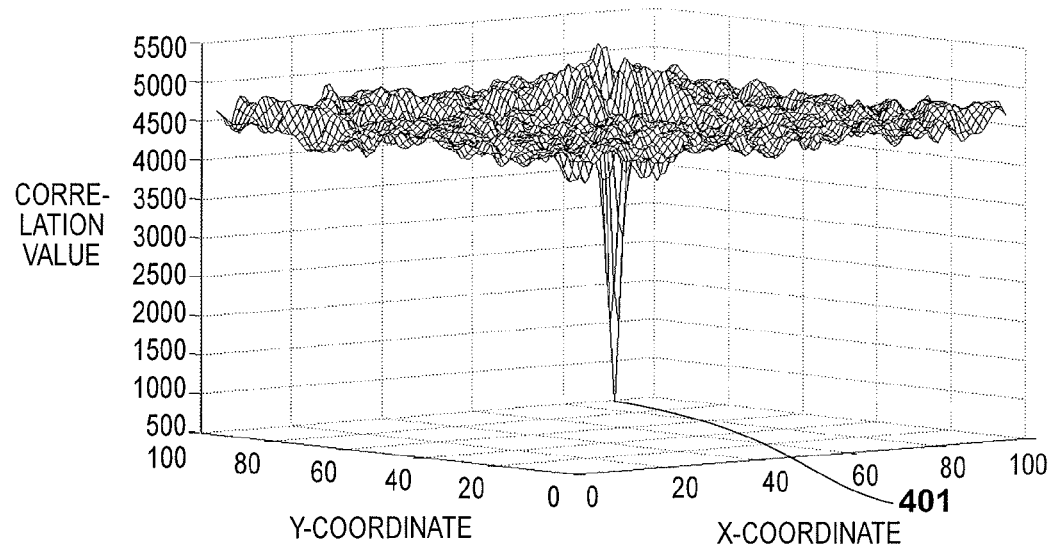
FIGS. 4A and 4B show examples of a correlation value map according to an embodiment of the present invention.
Figure 4B:
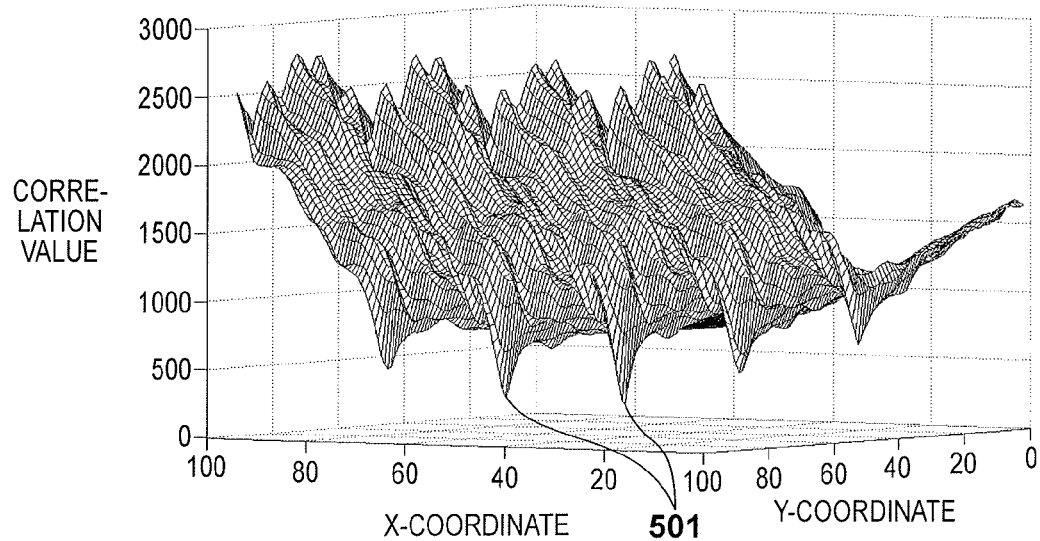

First, the operations of the difficult area determination unit 109 according to the present embodiment will be described. FIGS. 4A and 4B show examples of correlation value maps that present, as three-dimensional maps, a relation between positions of the correlation value calculation area in the search range and correlation values obtained at the positions, which has been calculated by the correlation value calculation unit 105. In these figures, x- and y-axes indicate the positions of the correlation value calculation area, and a z-axis indicates magnitudes of corresponding correlation values. As the SAD is used as a correlation value in the present embodiment, the smaller the correlation value, the higher the degree of similarity (correlation) between the template block 301 and the correlation value calculation area 303.

FIG. 4A shows a correlation value map for a case in which the texture of the template block 301 is suitable for template matching, that is to say, includes many complex patterns. In this case, there is a large difference between correlation obtained at a move destination and correlations obtained at other positions, and therefore the shape of the correlation value map has one steep peak 401 as shown in FIG. 4A. In this case, a motion vector can be calculated easily with high accuracy.

On the other hand, FIG. 4B shows an example of a correlation value map for a case in which the texture of the template block 301 is a repeating pattern composed of straight lines. In this case, the search range 302 includes a plurality of repeating patterns that are the same as the texture of the template block 301, and therefore the shape of the correlation value map has a plurality of peaks 501. In this case, unlike the case of FIG. 4A, it is not easy to correctly determine a peak to which a coordinate position serving as a true move destination corresponds. That is to say, an area including a repeating pattern is regarded as a difficult area in which correct calculation of a motion vector is difficult. While the above has described the case of a repeating pattern as an example of a difficult area, the difficult area is not limited in this way, and the same goes for a low-contrast area such as a plain wall, and an area including one line such as an electric cable against the sky. A motion vector detected from such a difficult area has low reliability, and can cause error in subsequent processing that uses the motion vector. Therefore, in order to suppress the influence on the accuracy of processing that uses the motion vector, it is necessary to determine whether or not an area in which the motion vector has been calculated is a difficult area.

Figure 5:
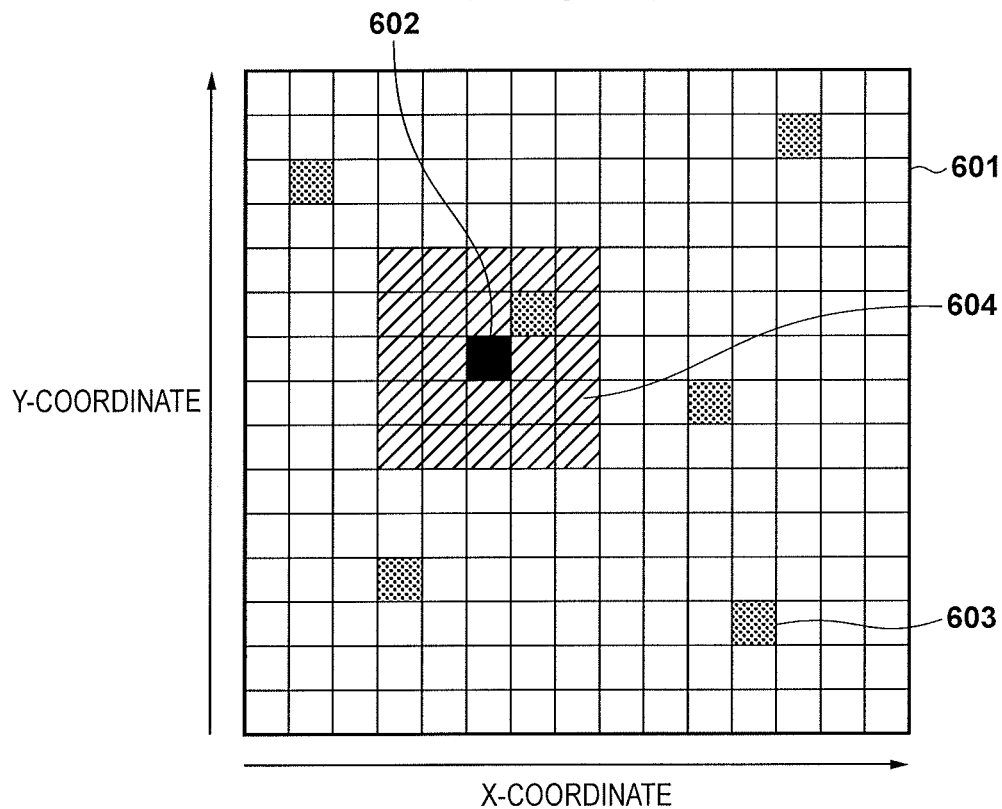
FIG. 5 schematically shows a correlation value map according to an embodiment of the present invention as viewed from above.

In the present embodiment, in order to thus determine a difficult area, the shape of a correlation value map is estimated from distribution of values showing high correlations among correlation values calculated by the correlation value calculation unit 105 and a relative magnitude relation among the correlation values. FIG. 5 schematically shows a correlation value map similar to those shown in FIGS. 4A and 4B as viewed from an upper side of an x-y plane (z>0).

A reference numeral 602 indicates a position of a value showing the highest correlation (a maximum peak) in a correlation value map 601, and a reference numeral 603 indicates a position of a peak showing high correlation other than the maximum peak position 602. It should be noted that a predetermined number of arbitrary peaks may be set as peak positions 603 in descending order of correlation, for example, starting from a value showing the second highest correlation in the correlation value map. FIG. 5 exemplarily shows six peaks.

As stated earlier, the shape of a correlation value map corresponding to a difficult area is such that a peak similar to the maximum peak in size exists at a plurality of positions. In view of this, the difficult area determination unit 109 obtains differences between high peak values corresponding to the peak positions 603 other than the maximum peak and the maximum peak value, and determines whether or not the values of the differences are equal to or smaller than a predetermined threshold. If any of the values of the differences between the high peak values and the maximum peak value is smaller than or equal to the threshold, the difficult area determination unit 109 determines that the template block is a difficult area. Here, the threshold is a value for determining the existence of a peak value that is close to the maximum peak value, and no particular limitation is placed on a method for setting the same. For example, an appropriate value may be decided on experimentally, and the threshold may be decided to be 5% of a range that a correlation value could take. Also, instead of obtaining the values of the differences, the difficult area determination unit 109 may obtain ratios of the high peak values other than the maximum peak to the maximum peak value, and determine whether or not the ratios fall within a predetermined range.

As described above, the difficult area determination unit 109 determines whether or not the template block is a difficult area by considering magnitude relations between a correlation value showing the highest correlation and other correlation values showing high correlations, among correlation values obtained at a plurality of positions in the reference image. Furthermore, in order to realize highly-accurate determination, the difficult area determination unit 109 according to the present embodiment considers positional relations among these correlation values showing high correlations.

As described with reference to FIG. 4A, a general correlation value map has a shape of a mountain or a valley centered at a position of the highest correlation, and it is natural, for example, that a correlation value obtained at a position adjacent to the position of the highest correlation is similar to the value showing the highest correlation in magnitude. Therefore, if a plurality of correlation values showing high correlations are extracted, it is highly likely that one or more of the extracted correlation values have been obtained in the neighborhood of the position of the highest correlation. Differences between these values and the value showing the highest correlation have a good chance of being equal to or smaller than the threshold. As a result, even in a case where a motion vector is able to be correctly detected as per FIG. 4A, it is determined that there are a plurality of correlation values showing correlations similar to the highest correlation, and the template block is erroneously determined as a difficult area.

In the present embodiment, in order to prevent such erroneous determination, the neighbor area deciding unit 108 sets a neighbor area 604 centered at the maximum peak position 602. The difficult area determination unit 109 excludes correlation values calculated at positions in the neighbor area 604 from comparison with the threshold so as to suppress the foregoing erroneous determination.

Figure 6A:
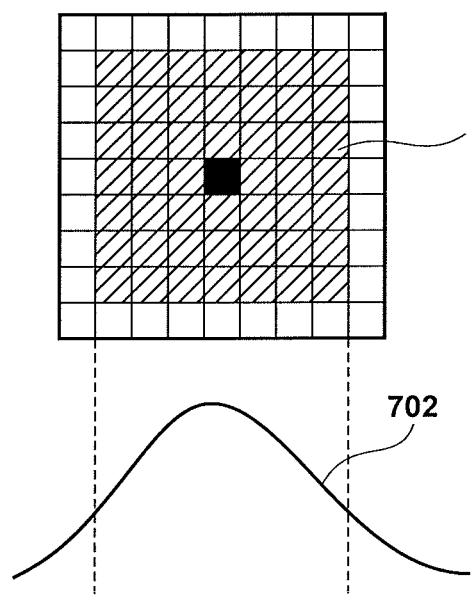
FIGS. 6A and 6B show examples of a relation between the shape of a peak in a correlation value map and a size of a neighbor area.
Figure 6B:
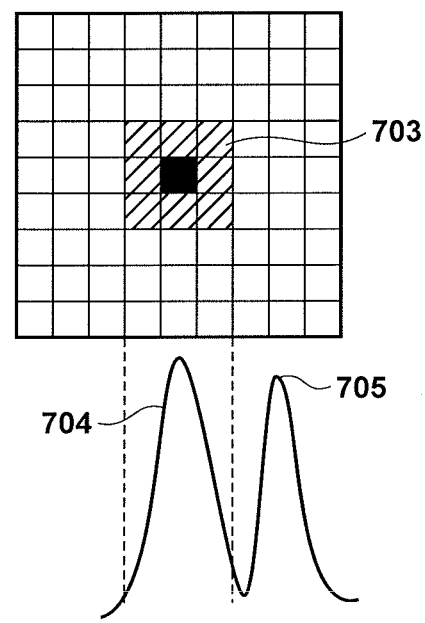

A description is now given of a method for setting the neighbor area 604. FIGS. 6A and 6B show examples of a relation between the shape of a cross section of a correlation value map and a range of a set neighbor area, the cross section representing a plane that intersects a maximum peak position and extends along a z-axis. FIG. 6A shows an example of setting of a neighbor area in a case where a maximum peak has a gentle shape. In FIG. 6A, a correlation value map 702 has a gentle cross-sectional shape, and shows distribution of correlation values that are similar in magnitude to the maximum peak over a relatively broad range centered at the maximum peak position. In the case of a correlation value map with such a shape, a motion vector can be detected with high accuracy, but setting a small neighbor area can cause the foregoing erroneous determination. For this reason, in a case where a correlation value map has a gentle shape, a large neighbor area 701 is set so as to exclude correlation values existing around the maximum peak from the threshold-based determination.

In contrast, assume a case of FIG. 6B in which a maximum peak 704 has a steep shape. In this situation, for example, if there is a peak 705 of correlation values attributed to a repeating pattern near the maximum peak 704, setting a large neighbor area causes exclusion of the peak 705 from comparison with the threshold; this results in erroneous determination, that is to say, the template block is not determined as a difficult area. For this reason, in a case where a maximum peak has a steep shape, it is necessary to make a neighbor area 703 small.

As described above, in order to determine a difficult area with high accuracy by setting a neighbor area, it is necessary to set a range of the neighbor area such that the size thereof corresponds to a gentle shape or a steep shape of a maximum peak in a correlation value map. In the present embodiment, whether a maximum peak in a correlation value map has a gentle shape or a steep shape is estimated from a shooting parameter, and a neighbor area is set based on the result of estimation.

Table 1 shows a relation between values of the shooting parameter and shapes of a correlation value map (shapes of a maximum peak).

TABLE 1

| Shape of Maximum Peak in Correlation Value Map | | Gentle | ↔ | Steep |
|---|---|---|---|---|
| Shooting Parameter | Shutter Speed | Long | ↔ | Short |
| | Gyroscope Data | Large Motion | ↔ | Small Motion |
| | Aperture | Maximum | ↔ | Narrow |

For example, if a shutter speed is slow (an exposure time period is long), blurring easily occurs in a captured image due to movements of a hand and a subject. If template matching is applied to an area in which such blurring has occurred, a maximum peak has a gentle shape, because a slight misalignment of a template position does not cause a large fluctuation in magnitudes of correlation values.

Conversely, if the shutter speed is short, the sharpness of a subject increases, and therefore a degree of correlation between a position in a template block and a position in an area of a search block that have matching textures is extremely high. However, at a position that is only slightly misaligned from that position, a texture difference increases significantly, and hence a degree of correlation decreases drastically, that is to say, a maximum peak has a steep shape. Therefore, when the shutter speed is used as a shooting parameter, it is sufficient to make a neighbor area used in determination of a difficult area large if the shutter speed is long, and small if the shutter speed is short.

On the other hand, in terms of movements of a hand and a subject, a range of a neighbor area can be decided on in accordance with motion information of the image capture apparatus obtained from an acceleration sensor, a gyroscope, and the like provided in the image capture apparatus. When the movement of the image capture apparatus is determined to be large, that is to say, at the time of camerawork such as panning and tilting or when it is determined that a large hand movement has occurred, it can be estimated that motion-induced blurring has occurred in a captured image, and therefore a large neighbor area is set. A relation between motion information and the size of the neighbor area can be obtained experimentally in advance.

Another example of a shooting parameter is an f-number. An amount of blurring in a background area increases as an aperture widens, the effect of which is notable especially at the time of close-up shooting. The more the f-number approaches a maximum aperture (the smaller the f-number becomes), the larger the amount of blurring in the image becomes, and therefore the gentler the shape of a maximum peak becomes. That is to say, it is sufficient to make a range of a neighbor area broader for a smaller f-number, and conversely to make a range of a neighbor area narrower for a larger f-number.

While the above has described a method for changing a range of a neighbor area depending on individual conditions of shooting parameters shown in Table 1, no limitation is intended in this regard, and a range of a neighbor area may be decided on based on a combination of different shooting parameters. Furthermore, a neighbor area may be decided on based on information other than the shooting parameters shown in Table 1, e.g., a subject distance, distortion information of an image, and the like. As described above, a difficult area can be determined in a favorable manner by the neighbor area deciding unit 108 estimating the shape of a correlation value map in accordance with a value of a shooting parameter of the image capture apparatus obtained from the shooting parameter obtaining unit 107, and by changing a range of a neighbor area accordingly. The neighbor area deciding unit 108 notifies the difficult area determination unit 109 of, for example, information showing the size of the neighbor area, and the difficult area determination unit 109 decides on a specific range of the neighbor area centered at a maximum peak position of correlation values (a position corresponding to the neighbor area). While the neighbor area has been assumed to be a square area herein, this is merely illustrative, and the neighbor area may have other shapes such as a circular area having a fixed radius and a rectangular area.

Returning to FIG. 2, in step S206, the difficult area determination unit 109 determines whether or not the template block is a difficult area based on the correlation values calculated by the correlation value calculation unit 105 and on the range of the neighbor area decided on by the neighbor area deciding unit 108. The difficult area determination unit 109 sets the neighbor area for a maximum peak, and determines that a current template block is a difficult area if any of differences between peaks of correlation values existing outside the neighbor area and the maximum peak is equal to or smaller than the predetermined threshold. It should be noted that, instead of setting an area, a distance corresponding to an area may be set. In this case, it is sufficient to compare peaks of correlation values obtained at positions that are distant from a position that yields the maximum peak by a predetermined distance or longer with the threshold.

While the template block may be determined as a difficult area if there is at least one correlation value that shows a difference equal to or smaller than the threshold outside the neighbor area (at a position that is distant from the maximum peak position by the predetermined distance or longer), the template block may be determined as a difficult area if the number of such correlation values is equal to or larger than a predetermined number (the predetermined number is plural). That is to say, the difficult area determination unit 109 can determine whether or not the template block is a difficult area based on the number of correlation values that exist outside the neighbor area and show differences equal to or smaller than the threshold. If the template block has been determined as a difficult area, the difficult area determination unit 109 outputs, for example, difficult area determination information (e.g., a flag and the like) indicating that the template block is a difficult area (the reliability of a detected motion vector is low) to the motion vector output unit 110. Alternatively, the difficult area determination unit 109 may output difficult area determination information indicating the result of determination, no matter what the result of determination is, to the motion vector output unit 110.

In step S207, the motion vector output unit 110 appends the difficult area determination information obtained from the difficult area determination unit 109 to motion vector information obtained from the motion vector detection unit 106, and then stores the same into the memory 104. It should be noted that information output from the motion vector output unit 110 may be recorded into a recording medium via a recording unit. The motion vector information and the difficult area determination information stored into the memory 104 can be used in, for example, anti-shake and subject tracking processes. At this time, the accuracy of the processes can be improved by not using motion vector information appended with information indicating that the template block is a difficult area, or by using such motion vector information after giving it a lower weight than motion vector information that is not appended with information indicating that the template block is a difficult area.

The flowchart shown in FIG. 2 is executed each time a motion vector is detected. It should be noted that, in a case where the processing of FIG. 2 is applied to frame images of a video, it may be executed for every single one of the frame images, or may be executed in a cycle of a plurality of predetermined frames.

Also, in step S206, at the time of determination of whether or not the template block is a difficult area, the difficult area determination unit 109 may determine whether or not a plurality of peaks of correlation values existing outside the neighbor area are positioned at an equal interval. For example, the difficult area determination unit 109 obtains, for each one of the plurality of peaks of correlation values existing outside the neighbor area, a distance from a nearest correlation value position. The difficult area determination unit 109 determines that the plurality of peaks of correlation values are positioned at an equal interval if the obtained plurality of distances indicate that every pair shows a difference equal to or smaller than a threshold.

When the plurality of peaks of correlation values existing outside the neighbor area are determined to be positioned at an equal interval, the difficult area determination unit 109 can use a motion vector obtained from the corresponding template block with a weight lower than a weight used when determined otherwise.

As described above, in the present embodiment, whether or not a template block is a difficult area (whether or not the reliability of a motion vector is low) is determined by considering not only magnitude relations between a maximum peak and other peaks of correlation values, but also positional relations between the maximum peak and other peaks. Specifically, a difficult area is determined based on magnitude relations with other peaks existing outside a neighbor area of the maximum peak (at positions that are distant from a maximum peak position by a predetermined distance or longer). This enables determination with higher accuracy. Furthermore, determination with even higher accuracy can be realized by making the size of a neighbor area (the length of the predetermined distance) variable depending on a shooting parameter. As a result, the reliability of a detected motion vector can be determined with high accuracy, and therefore reduction in the accuracy of processing that uses the motion vector can be suppressed.

Second Embodiment

A second embodiment of the present invention will now be described. The feature of the present embodiment is that the accuracy of determination of a difficult area is improved by setting neighbor areas individually for a plurality of template blocks that are set in a source image for detection of a motion vector.

Figure 7:
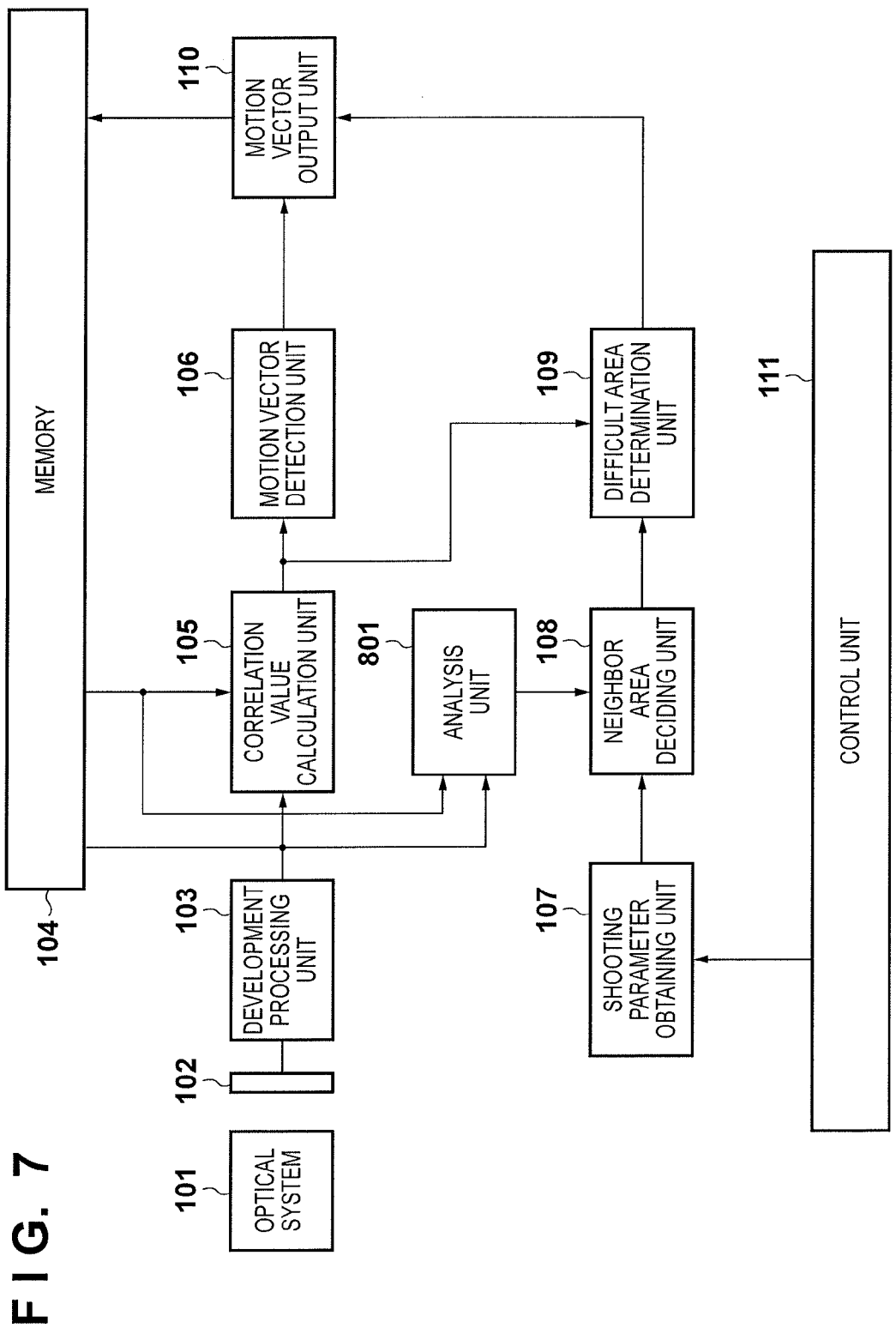
FIG. 7 is a block diagram showing an example of a functional configuration of an image capture apparatus, which is an example of an image processing apparatus according to a second embodiment of the present invention.

FIG. 7 is a block diagram showing an example of a functional configuration of an image capture apparatus according to the present embodiment, and constituent elements therein that are similar to those of the first embodiment are given the same reference numerals as FIG. 1. The image capture apparatus according to the present embodiment additionally includes an analysis unit 801 that performs image analysis on each one of a plurality of template blocks with respect to an image input from the development processing unit 103.

Figure 8:
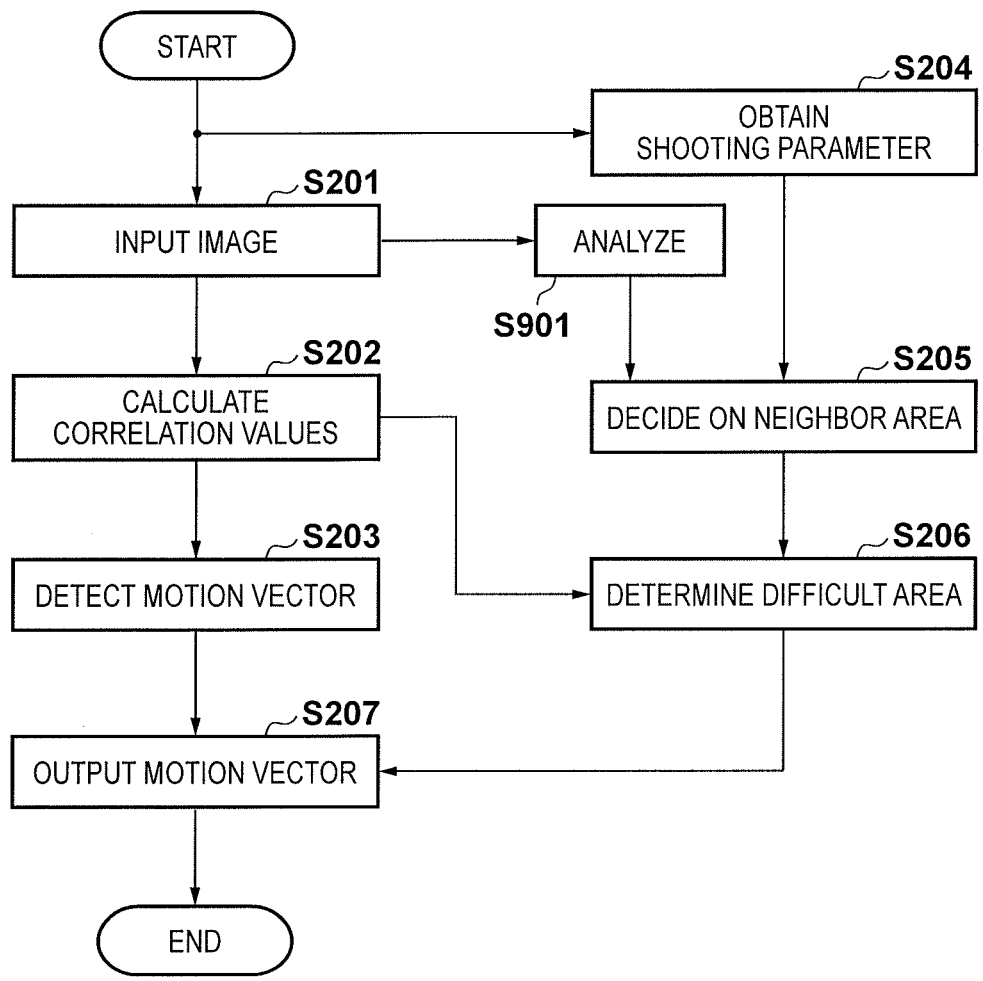
FIG. 8 is a flowchart for describing a motion vector detection operation of the image capture apparatus according to the second embodiment of the present invention.

A flowchart of FIG. 8 shows a motion vector detection operation of the image capture apparatus according to the present embodiment. In FIG. 8, steps that execute the same processes as the first embodiment are given the same reference numerals thereas, and the following describes processes that are unique to the present embodiment.

In step S901, the analysis unit 801 analyzes each of a plurality of template blocks in a source image stored in the memory 104.

Figure 9:
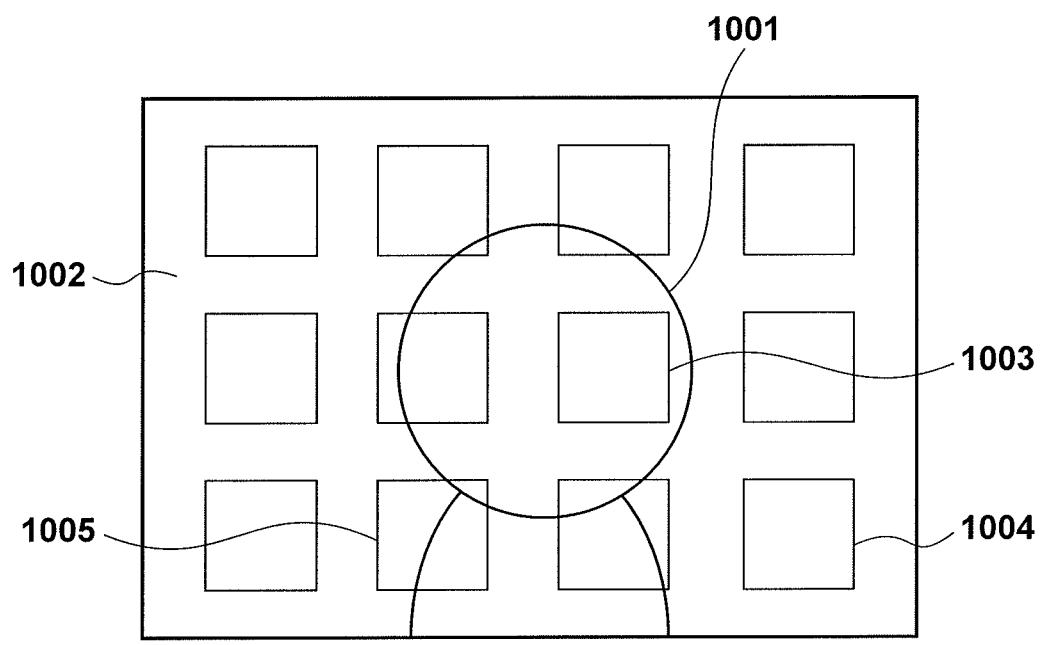
FIG. 9 shows an example of arrangement of template blocks in the second embodiment of the present invention.

FIG. 9 schematically shows an example of arrangement of template blocks. It will be assumed that a main subject 1001 such as a person and a flower exists at the center of a screen, and the optical system 101 is focusing on the main subject. On the other hand, a background 1002 is a blurry area in a case where image capture is performed with a maximum aperture, for example. The template blocks are set at a substantially uniform interval; four in a horizontal direction, and three in a vertical direction of the screen.

Among the template blocks shown in FIG. 9, a template block 1003 included in an area of the main subject 1001 is focused and thus has high sharpness, and a maximum peak of a correlation value map obtained using the template block 1003 has a steep shape. Therefore, a difficult area can be determined in a more favorable manner by reducing a range of a neighbor area in determination of the difficult area (reducing a predetermined distance) with respect to a template block arranged in an in-focus area.

On the other hand, a maximum peak of a correlation value map obtained using a template block 1004 arranged in the blurry background 1002 has a gentle shape. Therefore, a difficult area can be determined in a more favorable manner by enlarging a range of a neighbor area in determination of the difficult area (extending a predetermined distance) with respect to a template block arranged in a blurry area. As described above, the size of a neighbor area (the length of a predetermined distance) is determined in accordance with an in-focus degree and sharpness of an image.

It should be noted that, in terms of shape, a maximum peak of a correlation value map obtained in a template block that covers both a main subject area (in-focus area) and a background area (out-of-focus area), such as a template block 1005, is intermediate between a peak obtained in the in-focus area and a peak obtained in the out-of-focus area. Therefore, a range of a neighbor area corresponding to such a template block can be changed adaptively in accordance with, for example, a ratio between the in-focus area and the out-of-focus area included in the template block. Also, a degree of influence on subsequent processing is higher when it is erroneously determined that a template block yielding a motion vector of low reliability is not a difficult area than when it is erroneously determined that a template block yielding a motion vector of high reliability is a difficult area. For this reason, a template block that covers both a main subject area (in-focus area) and a background area (out-of-focus area) may be treated as a template block set in the out-of-focus area, and a small neighbor area may be set therefor.

The analysis unit 801 determines whether each one of the plurality of template blocks exists in a main subject area (in-focus area) or a background area (out-of-focus area). As it is assumed here that the main subject area is the in-focus area, the analysis unit 801 detects the main subject area in the image, and makes the determination using prestored information related to the positions and the sizes of the template blocks. No particular limitation is placed on a method for extracting the main subject area, and any known method may be used, including a general method for recognizing a specific object such as facial recognition, and area division processing based on positions of AF evaluation frames. It goes without saying that a user may designate a main subject through the operation unit. Furthermore, the main subject area and the background area may be separated using distance information obtained from an external range sensor. Also, it is permissible to calculate an amount of blurring or sharpness of the texture by calculating contrast and frequency characteristics in each one of the template blocks, and to determine that the template block is in the in-focus area if the amount of blurring is smaller than a threshold (the sharpness is equal to or higher than a threshold), and in the out-of-focus area if the amount of blurring is equal to or larger than the threshold (the sharpness is lower than the threshold).

It should be noted that a size A of a neighbor area set for a template block in the in-focus area and a size B of a neighbor area set for a template block in the out-of-focus area satisfy the relation A<B, and specific sizes can be, for example, decided on experimentally. Also, it is permissible to decide on three or more size (distance) levels, e.g., set a smaller a neighbor area (a shorter predetermined distance) for higher sharpness. It should be noted that also, at the time of a follow shot, the main subject area is focused and the background area is in an out-of-focus state due to motion-induced blurring, and therefore a similar result of analysis is obtained by the analysis unit 801. As described above, as long as the steepness of the shape of a maximum peak in a correlation value map can be estimated through analysis, the present embodiment can be applied to an image of any scene.

For each individual template block, the analysis unit 801 outputs information that indicates whether the template block exists in the in-focus area or the out-of-focus area (alternatively, only information that indicates one of the in-focus area and the out-of-focus area in which the template block exists) to the neighbor area deciding unit 108 as the result of analysis.

Then in step S205, the neighbor area deciding unit 108 estimates the shape of a maximum peak of a correlation value map based on at least one of the shooting parameter from the shooting parameter obtaining unit 107 and the result of analysis from the analysis unit 801. Thereafter, the neighbor area deciding unit 108 decides on a range of a neighbor area for each one of the template blocks based on the result of estimation.

In a case where a neighbor area is decided on based on both of the shooting parameter and the result of analysis, the neighbor area deciding unit 108 can decide on the size of the neighbor area using a variety of methods. For example, the neighbor area deciding unit 108 can decide on a small neighbor area if both of the shooting parameter and the result of analysis suggest a maximum peak of a steep shape, and decide on a large neighbor area if both of the shooting parameter and the result of analysis suggest a maximum peak of a gentle shape. On the other hand, if the shooting parameter and the result of analysis suggest maximum peaks of different shapes, it is permissible to decide on a neighbor area preferentially based on a predetermined one of the shooting parameter and the result of analysis, and to decide on a small neighbor area so as to avoid a situation in which the reliability is erroneously determined to be high. For example, in a case where the analysis unit 801 analyzes sharpness with respect to the template blocks, the result of analysis may be prioritized with the assumption that a degree of reliability of analysis is high. In the present case also, a neighbor area is not limited to having two sizes, and it is permissible to adopt a configuration in which one of three or more size levels, including an intermediate size, is selected.

Processes from step S206 are similar to those of the first embodiment, and therefore a description thereof will be omitted.

As described above, in the present embodiment, whether a maximum peak of degrees of correlation has a steep shape or a gentle shape is estimated with respect to a template block based on the result of analysis on a source image, and a neighbor area of a size based on the result of estimation is decided on. For example, with respect to a template block that is set in a main subject area and an in-focus area, a maximum peak of degrees of correlation is estimated to have a steep shape. On the other hand, with respect to a template block that is set in an area other than the main subject area, a background area, and an out-of-focus area, a maximum peak of degrees of correlation is estimated to have a gentle shape. It is hence possible to increase the possibility of deciding on a neighbor area of an appropriate size, and to realize determination of a difficult area with higher accuracy than the first embodiment.

Other Embodiments

While the above embodiments have described a case in which an (old) image stored in the memory 104 is used as a source image and a (current) image output from the development processing unit 103 is used as a reference image, the source image and the reference image may be reversed. In this case, a position in the old image from which a template block set in the current image has moved is searched for, and processing for detecting an initial point of a motion vector from a terminal point thereof is executed.

Also, a difficult area can be determined using only a source image. For example, on the basis of a template block set in the source image, a neighbor area is set in the source image, and it is determined whether or not a correlation value that shows a difference equal to or smaller than a threshold exists outside the neighbor area in the source image. An area including a correlation value that shows a difference equal to or smaller than the threshold is determined as a difficult area. It is sufficient to detect a motion vector between the source image and the reference image with the exclusion of this difficult area.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-224622, filed on Oct. 29, 2013, and Japanese Patent Application No. 2014-161862, filed on Aug. 7, 2014, which are hereby incorporated by reference herein their entirety.

What is claimed is:

1. An image processing apparatus comprising:
a processor; and
a memory including instructions that, when executed by the processor, cause the processor to:
obtain a plurality of images;
calculate correlation values between the plurality of images with respect to relative positions;
detect a motion vector between the plurality of images based on the correlation values;
determine reliability of the motion vector; and
perform at least one of an anti-shake process and a moving object tracking process with the motion vector,
wherein
the processor determines the reliability based on a value indicating the highest correlation among the correlation values and a correlation value, among the correlation values, obtained at a position that is distant by a predetermined distance or longer from a position at which the value indicating the highest correlation is obtained.

2. The image processing apparatus according to claim 1, wherein
the processor determines the reliability based on the number of correlation values, among the correlation values, which are obtained at positions that are distant by the predetermined distance or longer from the position at which the value indicating the highest correlation among the correlation values is obtained, and which are different from the value indicating the highest correlation by a predetermined threshold or less.

3. The image processing apparatus according to claim 1, wherein
the processor determines that the reliability of the motion vector is low if the number of correlation values, among the correlation values, which obtained at positions that are distant by the predetermined distance or longer from the position at which the value indicating the highest correlation among the correlation values is obtained, and which are different from the value indicating the highest correlation by a predetermined threshold or less, is equal to or larger than a predetermined number.

4. The image processing apparatus according to claim 1, wherein
the processor decides on the predetermined distance in accordance with at least one of a shooting parameter of one of the plurality of images and a result of analysis on one of the plurality of images.

5. The image processing apparatus according to claim 4, wherein the shooting parameter is one or more of a shutter speed, an f-number, and apparatus motion information.

6. The image processing apparatus according to claim 5, wherein
the processor makes the predetermined distance longer for a slower shutter speed.

7. The image processing apparatus according to claim 5, wherein
the decision-unit processor makes the predetermined distance longer for a smaller f-number.

8. The image processing apparatus according to claim 5, wherein
the processor makes the predetermined distance longer for a larger moving amount shown by the apparatus motion information.

9. The image processing apparatus according to claim 4, wherein the result of analysis is an in-focus degree of an image or sharpness of an image.

10. The image processing apparatus according to claim 9, wherein the result of analysis is a result of analysis with respect to a template block set in one of the plurality of images, and the decision unit makes the predetermined distance shorter when the template block is set in an in-focus area than when the template block is set in an out-of-focus area.

11. The image processing apparatus according to claim 9, wherein the result of analysis is a result of analysis with respect to a template block set in one of the plurality of images, and the decision unit makes the predetermined distance shorter for higher sharpness of the template block.

12. An image processing apparatus comprising:
a processor; and
a memory including instructions that, when executed by the processor, cause the processor to:
obtain a first image and a second image;
calculate, for a plurality of positions in the first image, correlation values with respect to a reference area set in the first image;
detect a motion vector between the first image and the second image; and
perform at least one of an anti-shake process and a moving object tracking process with the motion vector, wherein
the processor sets an area from which the motion vector is detected based on a correlation value obtained at a position that is distant by a predetermined distance or longer from the reference area.

13. An image capture apparatus comprising:
the image processing apparatus according to claim 1; and
an image sensor which captures the plurality of images.

14. An image processing method executed by an image processing apparatus, the image processing method comprising:
an obtaining step of obtaining a plurality of images;
a calculation step of calculating correlation values between the plurality of images with respect to relative positions;
a detection step of detecting a motion vector between the plurality of images based on the correlation values;
a determination step of determining reliability of the motion vector; and
a performing step of performing at least one of an anti-shake process and a moving object tracking process with the motion vector, wherein in the determination step, the reliability is determined based on a value indicating the highest correlation among the correlation values and a correlation value, among the correlation values, obtained at a position that is distant by a predetermined distance or longer from a position at which the value indicating the highest correlation is obtained.

15. An image processing method executed by an image processing apparatus, the image processing method comprising:
an obtaining step of obtaining a first image and a second image;
a calculation step of calculating, for a plurality of positions in the first image, correlation values with respect to a reference area set in the first image;
a detection step of detecting a motion vector between the first image and the second image; and
a performing step of performing at least one of an anti-shake process and a moving object tracking process with the motion vector, wherein
in the detection step, an area from which the motion vector is detected is set based on a correlation value obtained at a position that is distant by a predetermined distance or longer from the reference area.

16. A non-transitory computer-readable storage medium storing a program for causing a computer to function as the an image processing apparatus comprising:
an obtaining unit configured to obtain a plurality of images;
a calculation unit configured to calculate correlation values between the plurality of images with respect to relative positions;
a detection unit configured to detect a motion vector between the plurality of images based on the correlation values; and
a determination unit configured to determine reliability of the motion vector; and
an anti-shake unit configured to perform at least one of an anti-shake process and a moving object tracking process with the motion vector,
wherein the determination unit determines the reliability based on a value indicating the highest correlation among the correlation values and a correlation value, among the correlation values, obtained at a position that is distant by a predetermined distance or longer from a position at which the value indicating the highest correlation is obtained.

17. A non-transitory computer-readable storage medium storing a program for causing a computer to function as the an image processing apparatus comprising:
an obtaining unit configured to obtain a first image and a second image;
a calculation unit configured to calculate, for a plurality of positions in the first image, correlation values with respect to a reference area set in the first image;
a detection unit configured to detect a motion vector between the first image and the second image; and
an anti-shake unit configured to perform at least one of an anti-shake process and a moving object tracking process with the motion vector, wherein
the detection unit sets an area from which the motion vector is detected based on a correlation value obtained at a position that is distant by a predetermined distance or longer from the reference area.

* * * * *